(No Model.)
A. TROUSDALE.
MECHANICAL DEVICE FOR CHANGING RECIPROCATING TO ROTARY MOTION.
No. 272,602. Patented Feb. 20, 1883.
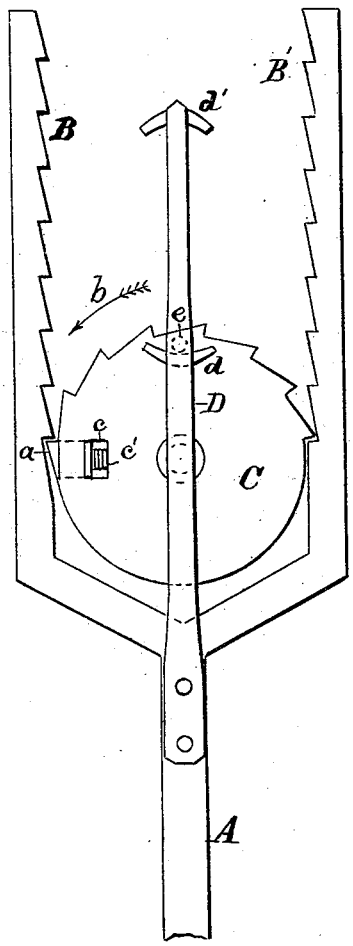
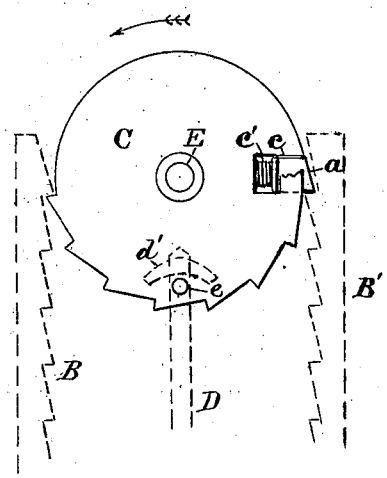
Witnesses:
Arthur L. Morsell
Charles Fairman
Inventor:
Alexander Trousdale,
By Halstead & Co.
Attorneys.

UNITED STATES PATENT OFFICE.

ALEXANDER TROUSDALE, OF ST. LOUIS, MISSOURI, ASSIGNOR OF ONE-HALF TO JAMES TROUSDALE, OF SAME PLACE.

MECHANICAL DEVICE FOR CHANGING RECIPROCATING TO ROTARY MOTION.

SPECIFICATION forming part of Letters Patent No. 272,602, dated February 20, 1883.

Application filed June 30, 1882. (No model.)

*To all whom it may concern:*

Be it known that I, ALEXANDER TROUSDALE, a citizen of the United States of America, residing at St. Louis, in the county of St. Louis and State of Missouri, have invented certain new and useful Improvements in Mechanical Devices for Changing Reciprocating to Rotary Motion, of which the following is a specification, reference being had therein to the accompanying drawings.

This invention relates to mechanism for changing reciprocating motion to rotary motion by means of two racks arranged oppositely and an intervening gear-wheel; and it consists in certain improvements in such mechanism, as herein shown, described, and claimed.

In the accompanying drawings, Figure 1 is a side view of a device for changing motion having my improvement. Fig. 2 is also a partial side view further illustrating the device.

A designates a reciprocating arm or driver connected with an engine or other machine to which the device may be applied, the said arm being provided with the opposite racks, B and B', having teeth, which are usually made inclined in opposite directions, as shown; but any form of teeth or cogs may be used.

On a shaft, E, between the two racks, is a wheel, C, having teeth corresponding with the teeth of the racks on half only of the periphery of the wheel to engage alternately with the opposite racks. The plain half of the periphery is on a circle with the base of the teeth. The wheel is provided with a loose tooth, $a$, which is placed in a recess, $c$, in the wheel, and is pressed outward by a spring, $c'$. This allows the tooth $a$ to yield to pressure during the rotation of the wheel, this being necessary as the wheel rotates in one direction, as indicated by the arrow $b$, making an entire revolution during the forward and backward strokes of the driver.

D indicates a stock fastened to the arm A, and provided with the stops $d$ and $d'$, each of which catches a stud, $e$, fixed to the wheel, alternately at the end of a stroke—that is, the stop $d$ catches the stud $e$ at the end of an outward stroke, and the stop $d'$ catches the stud at the end of the opposite stroke. The relative positions of the parts at the end of each stroke are indicated in the two figures of the drawings.

The device may be modified in construction by providing each of the racks with a spring-tooth instead of the wheel, and a similar result produced.

I claim—

1. In a device for changing motion, a reciprocating frame having opposite racks, in combination with a gear-wheel provided with a spring-tooth, substantially as herein set forth and described.

2. In combination with arm A, carrying two opposite racks, the gear-wheel C, provided with a spring-tooth and with stud $e$, the stock D, and stops $d$ and $d'$, substantially as and for the purposes set forth.

In testimony whereof I affix my signature in presence of two witnesses.

ALEXANDER TROUSDALE.

Witnesses:
W. E. EMANUEL,
STEPH. H. DARDEN.